F. L. SIMMONS.
MAGNETIC CHUCK.
APPLICATION FILED SEPT. 14, 1916.

1,435,946.

Patented Nov. 21, 1922.

Inventor
Frank L. Simmons.
By Geo. H. Kennedy
Attorney

Patented Nov. 21, 1922.

1,435,946

UNITED STATES PATENT OFFICE.

FRANK L. SIMMONS, OF MILLBURY, MASSACHUSETTS, ASSIGNOR TO THE TAFT-PEIRCE MANUFACTURING COMPANY, OF WOONSOCKET, RHODE ISLAND, A CORPORATION OF RHODE ISLAND.

MAGNETIC CHUCK.

Continuation in part of application Serial No. 870,531, filed November 5, 1914. This application filed September 14, 1916. Serial No. 120,189.

*To all whom it may concern:*

Be it known that I, FRANK L. SIMMONS, a citizen of the United States, residing at Millbury, in the county of Worcester and Commonwealth of Massachusetts, have invented a new and useful Improvement in a Magnetic Chuck, of which the following, together with the accompanying drawings, is a specification, the present application being a continuation in part of the subject matter of my copending application Serial No. 870,531, filed November 5, 1914.

The present invention relates to a magnetic chuck for a work supporting surface adapted, when magnetized, to retain iron and steel pieces of work in fixed position to be operated upon by the machine with which the chuck is used. The invention consists in the construction and arrangement of parts set forth in detail in the following description, as previously disclosed, in part, in my aforesaid copending application, the novel features of construction, by virtue of which a chuck having an increased holding power, with no appreciable leakage of the lines of magnetic force, is produced, are particularly pointed out in the appended claims.

In the accompanying drawings.

Similar reference characters refer to similar parts in the different figures.

Figure 1:
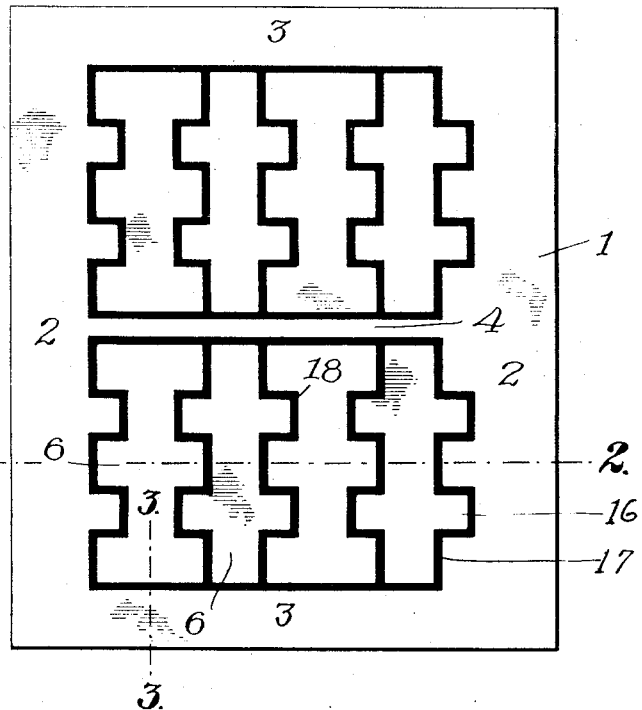
Fig. 1 is a top plan view of a chuck embodying my invention.
Figure 2:
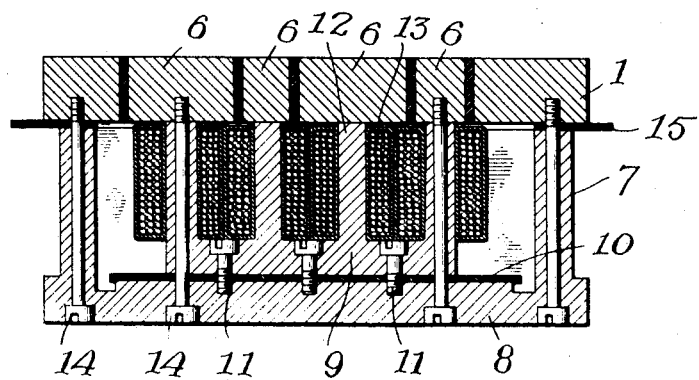
Fig. 2 is a vertical sectional view on the line 2—2 of Fig. 1.

Referring to the drawings, 1 indicates a rectangular face plate frame inclosing a rectangular space between its ends 2, 2 and its sides 3, 3, said space, in the present instance, being divided by a cross bar 4 parallel with the sides 3, 3. The two spaces thus formed on opposite sides of the cross bar 4 are adapted to be filled by the face plate pole pieces of the chuck, in the manner hereinafter set forth, it being clear that a chuck of smaller size having only a single space may be provided; in the present instance I have shown a construction in which the face plate pole pieces, constituting the work holding face of the chuck, are disposed longitudinally with respect to the longest dimension of the face plate frame 1, but it is clear that the length of the chuck between the ends 2, 2 of the face plate frame can be increased indefinitely by the addition of similarly disposed face plate pole pieces, whereby a chuck having its face plate pole pieces extending longitudinally of the shortest dimension of the face plate frame may be produced.

Figure 3:
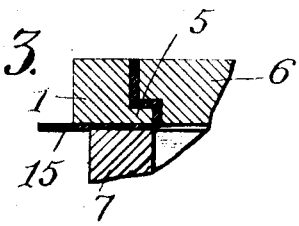
Fig. 3 is a fragmentary sectional view on the line 3—3 of Fig. 1.

In the construction of said face plate frame 1, the sides 3, 3 and the cross bar 4 are preferably formed with oppositely facing horizontal flanges 5, as shown in Fig. 3, providing steps for the support of the ends of face plate pole pieces 6, the latter being shouldered to overhang said steps when assembled within said frame. The several face plate pole pieces 6 are disposed side by side in a row or rows, and in conjunction with their interposed gaps of non-magnetic metal, hereinafter more specifically referred to, entirely fill the space or spaces inclosed by the sides and ends of frame 1, thereby forming, entirely by themselves, the work holding face of the chuck.

The construction above described constitutes the detachable face plate of my improved chuck. As herein shown, the rectangular frame 1 is flush on its upper and lower surface with said face plate pole pieces 6, said frame being disposed in slightly overhanging relation to the sides and ends of a shell or housing 7, which is in the form of a rectangular box open at its upper end, and having a preferably integral bottom 8. Said housing serves for the inclosure of the core casting or core castings 9, one of the latter being employed for each row of pole pieces 6. The core casting 9 rests on a plate 10 of brass or other non-magnetic material, interposed between the same and the bottom 8 of the shell. Brass screws 11 are preferably employed to retain the core casting in fixed position within the shell.

A series of upstanding projections 12, comprising core pole pieces and corresponding in number to the number of pole pieces 6 in each row, are formed integral with each core casting 9, to provide cores for the individual energizing coils 13, one of the latter being provided for each face plate pole piece 6.

Said coils are so wound and connected that opposite magnetic polarity is imparted to adjacent core pole pieces 12 of each row, the upper ends of which, having been finished simultaneously with the edges of the sides and ends of housing 7, make intimate magnetic contact with the superposed face plate pole pieces 6, when the face plate, having a finely finished under surface, is disposed in position upon the shell. Brass screws 14, extending from the bottom 8 into the corners of frame 1 and into the end pole pieces 6 of each row, are preferably employed to retain the detachable face plate in position.

When the face plate is detached, the several coils 13 are exposed for inspection and repair. Furthermore, this construction of the face plate permits, when desired, the insertion of a thin plate 15, of tin or other suitable material, between the under surface of the plate and the upper edges of the housing, to prevent the leakage of water into the space containing the coils 13 when the chuck is used in "wet grinding", or similar operations. Such a plate, when shaped to correspond in outline to the housing 7 may, with advantage, be made of the same thickness as the plate 10, so that the core pole pieces 12, having been finished flush with the housing in the absence of plate 10, will be lifted sufficiently by said plate 10 to make perfect magnetic contact with the face plate pole pieces 6 when the plate 15 is used.

In the manufacture of the detachable face plate it is desirable to form the longitudinal edges of the face plate pole pieces 6 with interlocking projections and recesses 16 and 17, respectively, as shown in Fig. 1, the inner edges of the ends 2 of the frame being correspondingly shaped to conform to the edges of the two end face plate pole pieces of each row. The gaps 18 between adjacent face plate pole pieces, and between said pole pieces and the sides and ends of the frame 1, are filled with a non-magnetic substance, such as Babbitt metal, thus locking the face plate pole pieces firmly in position within the frame 1. Because of the interlocking construction of the face plate pole pieces, the actual length of the gaps 18 is increased and the same are brought into closer proximity at certain portions of the work holding face than would be possible with an equal number of face plate pole pieces having straight longitudinal edges.

The plate 10 serves to insulate the core casting from the shell of the chuck, so there is no appreciable leakage of lines of magnetic force into the bottom, sides and ends of said shell. The construction provides a chuck capable of exerting a powerful holding force on any piece of work which is disposed so as to bridge any of the gaps 18 between adjacent pole pieces 6 and the work holding face. Said face is constituted entirely by the face plate pole pieces 6, and is wholly free of any dead or unmagnetized areas. The possibility of leakage of lines of magnetic force from the core pole pieces 12 to any portion of the shell or housing 7 is largely eliminated by the use of the brass plate 10. Furthermore, the construction is such that a perfect series of joints between the face plate pieces 6 and their respective core pole pieces 12 is easy of attainment, thus insuring the transmission of the full magnetic holding power to the face of the chuck with a minimum of leakage.

I claim,

1. A magnetic chuck comprising a base member, a plurality of core pole pieces integral with the base member and extending upwardly therefrom, a plurality of removable work face pole pieces mounted in such manner that one pole piece rests on each of the said core pole pieces, coils mounted on said core pole pieces and adapted when energized to produce a series of magnetic circuits with the adjacent pole pieces of different signs and with each core pole piece comprising a common path for a portion of adjacent magnetic circuits, and a housing surrounding and protecting the core pole pieces.

2. A magnetic chuck comprising an energizing means, a shell surrounding said energizing means and magnetically insulated therefrom, and a face plate detachably secured to said shell in magnetic connection with said energizing means.

3. A magnetic chuck, comprising a work holding face having a plurality of pole pieces with nonmagnetic gaps between adjacent edges of the same, each pole piece presenting alternating thick and thin sections measured transversely of the same, with the thick and thin sections of adjacent pole pieces in interlocking relation with each other, a frame around said pole pieces, and non-magnetic gaps between said pole pieces and said frame.

4. A magnetic chuck, comprising a work holding face having a plurality of adjacent pole pieces with nonmagnetic gaps between adjacent edges of the same, each pole piece presenting alternating thick and thin sections measured transversely of the same, with the thick and thin sections of adjacent pole pieces in interlocking relation with each other, and means for imparting opposite magnetic polarity to adjacent pole pieces.

5. A magnetic chuck comprising a work holding face having a plurality of pole pieces each having adjacent interlocking edges and presenting alternating thick and thin work faces, whereby each pole piece comprises a work surface of tree-like formation with branches extending from each side of the trunk thereof and in interlocking relation with a congruously formed adjacent pole piece.

6. A magnetic chuck comprising a work holding face constituted by a row of pole pieces, means for imparting opposite magnetic polarity to adjacent pole pieces of the row, and an unpolarized frame surrounding said pole pieces and providing support for the ends of the pole pieces.

7. A magnetic chuck, comprising a housing or shell, a detachable face plate therefor constituting the work holding face of the chuck, an energizing means for said face plate inclosed within said shell and adapted to be adjustably supported thereby to make magnetic contact with said face plate, and insulating means interposed between said energizing means and said shell, whereby to permit of the insertion of a plate of the same thickness between said face plate and said shell.

8. In a magnetic chuck, a housing, energizing means provided with individualized pole pieces mounted on a common base within said housing and spaced apart therefrom by non-magnetic material, a work face having a plurality of pole piece members operatively connected with the pole pieces within said housing, said pole piece members comprising work faces of tree-like formation with branches extending from each side of the trunks thereof and in interlocking relation with congruously formed pole pieces on each side thereof, all of said pole pieces being separated one from another by non-magnetic material.

9. A magnetic chuck comprising a housing, electrical energizing means within said housing, a work face member in magnetic operative connection with said energizing means, said work face member comprising a plurality of individualized pole pieces arranged adjacent one to the other and adapted to constitute negative and positive poles arranged in alternation when said energizing means is operative, said pole pieces being formed with work surfaces of a tree-like conformation with branches extending on opposite sides of the trunk, and adjacent pole pieces being congruous whereby said branches are arranged in interlocking relation.

10. A magnetic chuck comprising a work holding face constituted by a plurality of pole pieces arranged in a series, means for imparting opposite magnetic polarity to adjacent pole pieces in said series, a frame supporting and surrounding said pole pieces, and non-magnetic material separating each of said pole pieces and between said pole pieces and said frame.

11. A magnetic chuck comprising a work holding face constituted by a plurality of pole pieces arranged in a series, non-magnetic material between each of said pole pieces, an energizing coil for each of said pole pieces, said coils being wound in such manner as to impart opposite magnetic polarity to adjacent pole pieces when said coils are energized, a frame surrounding said pole pieces, and non-magnetic material between said frame and said pole pieces.

12. A magnetic chuck comprising a work face constituted by a plurality of interlocked tree shaped pole pieces of magnetic material arranged in series, means for imparting opposite magnetic polarity to adjacent pole pieces in said series, a frame surrounding said pole pieces and insulated from said means, said insulation comprising non-magnetic material between said pole pieces and said frame.

13. A magnetic chuck comprising a work holding face constituted by a plurality of individual pole pieces formed of magnetic material and arranged in a series, means comprising a coil for each pole piece constructed to impart opposite magnetic polarity to adjacent pole pieces in said series when said coils are energized, a frame surrounding said pole pieces, and non-magnetic material interlocking with said pole pieces and said frame to fixedly secure said pole pieces within said frame.

14. As an article of manufacture a face plate for magnetic chucks and the like, said face plate comprising a plurality of spaced-apart pole pieces, the work-face of each pole piece being of a formation substantially comprising a series of Greek crosses arranged end to end in a row, the outstanding cross arms of adjacent pole pieces being arranged in alternation, whereby the arms of one pole piece extend between the arms of an adjacent pole piece.

15. A magnetic chuck comprising a body portion, a magnetizable core supported by and separable from said body portion and having a plurality of pole pieces, means to magnetize said pole pieces to constitute a series of magnetic circuits, each circuit thereof having a common magnetic line path with the next adjacent circuit, a face plate pole piece for each core pole piece, and each face plate pole piece being a part of two adjacent magnetic circuits of said series.

16. A magnetic chuck comprising in combination a housing, a face plate frame separable from said housing, magnetizable means supported by said housing through said face plate frame and constituting conductors for the magnetic lines of force, and electro-magnetic means supported by and separable from said housing and capable when energized of providing a plurality of parallel magnetic circuits of opposite magnetic signs with a portion of each circuit common to a portion of each adjacent circuit and with an air gap in each circuit over the magnetizable means.

17. A magnetic chuck comprising in combination a housing, a core having pole pieces with the common base thereof detachably secured to the base of said housing, a separable face plate frame, face plate pole pieces carried by said face plate frame and in contact with the pole pieces of the core to provide a plurality of magnetic circuits, and means capable when energized of setting up in said core and said face plate pole pieces a plurality of magnetic circuits of opposite magnetic signs with a portion of each circuit traversing a portion of the base of said core and with an air-gap in each circuit over the face plate pole pieces.

18. In a magnetic chuck the combination of a housing, means comprising a core detachably supported by said housing, a removable face plate carrying a plurality of work-face pole pieces, said means being adapted when suitably electrically energized of producing a plurality of magnetic circuits, each circuit having a common magnetic line path with an adjacent circuit, each circuit including a work-face pole piece common with the next adjacent circuit, and all circuits having a common magnetic line path comprising the base of said core.

19. A magnetic chuck comprising an unpolarized housing, a core piece having a plurality of core pole pieces integral with a base portion which is detachably secured to said housing, a plurality of removable work-face pole pieces one on each end of said core pole pieces and being supported thereby, and coils carried by each of said core pole pieces and adapted when energized to produce a series of magnetic circuits of different signs with each core pole piece comprising a common path for a portion of adjacent magnetic circuits.

20. In a magnetic chuck a plurality of work-face pole pieces, a supporting core piece for each pole piece, a metallic housing having a base adapted to detachably support said core pieces, and means when energized capable of magnetizing said core pieces and pole pieces, the base of said housing being unpolarized and being adapted to be secured to the bed of a machine tool, whereby a continuous metal support is provided between each pole piece and the bed of the machine tool without constituting the machine bed and tool a shunt circuit for magnetic lines of force when the chuck is in operation.

21. A magnetic chuck comprising a supporting shell, a unitary energizing unit mounted within and spaced apart from said shell, means to removably connect said energizing unit to said shell, a face plate comprising a plurality of individual pole pieces adapted to be in magnetic circuit with said energizing unit, and means for detachably securing said face plate to said energizing unit.

22. A magnetic chuck comprising an energizing means, a shell surrounding and supporting said energizing means and magnetically insulated therefrom, and a face plate detachably secured to said shell in magnetic connection with said energizing means and adapted to be supported both by the energizing means and the shell.

23. A magnetic chuck comprising a work-holding face constituted by a row of pole pieces, supporting means located beneath said pole pieces and being adapted when energized by a suitable electric current to impart opposite magnetic polarity to adjacent pole pieces of the row, an unpolarized frame in which said pole pieces are supported, and an unpolarized housing adapted to carry said supporting means and also adapted to support the said frame.

24. A magnetic chuck comprising a shell, magnetizing means supported by the bottom of said shell and insulated therefrom, a frame superposed on said shell, and pole pieces carried by and insulated from said frame, and adapted to be energized by said magnetizing means.

25. A magnetic chuck face comprising two series of arms of opposite polarities, the arms of one series alternating with those of the other series, and each arm having lateral projections extending therefrom and each fitting into a space between similar projections of the next adjacent arm, and narrow strips of non-magnetic material separating said two series of arms.

26. A face plate for a magnetic chuck comprising a plurality of pole pieces, said pole pieces each comprising arms arranged in two series, with the arms of one of the two series alternating with the other, and a continuous strip of non-magnetic material separating the said pole pieces.

27. A magnetic chuck having a series of arms, and projections extending laterally from said arms, a second series of arms alternating with the arms of the first series and provided with lateral projections lying between the projections of the next adjacent arms, the two series of arms and their projections forming pole pieces of opposite polarity, non-magnetic material separating said pole pieces, a core for each arm of one of said series, and a magnetizing coil for each of said cores.

28. The combination with a support, of magnetic holding devices having a work supporting face comprising pole pieces of opposite polarities, non-magnetic material interposed between said support and said magnetic holding means, and means for removably securing said support, said magnetic holding means, and said non-magnetic material together.

29. The combination of a machine, a magnetic chuck supported by said machine to hold the work upon which the machine operates, and means for magnetically insulating the magnetic lines of force of said chuck from the part of the machine which supports the chuck.

30. The combination of a machine, a magnetic chuck supported by said machine to hold the work on which the machine operates, and means for magnetically insulating the chuck from the part of the machine that supports it.

31. A magnetic chuck having a work holding face comprising a series of arms and projections extending laterally from said arms, a second series of arms alternating with the arms of the first series and provided with lateral projections lying between the projections of the next adjacent arms, the two series of arms and their projections forming pole members of opposite polarities, and non-magnetic material separating said pole pieces.

FRANK L. SIMMONS.

Witnesses:
PENELOPE COMBERBACH,
NELLIE WHALEN.